United States Patent
Okumura

(10) Patent No.: US 9,664,866 B2
(45) Date of Patent: May 30, 2017

(54) OPTICAL TRANSMISSION MODULE AND MANUFACTURING METHOD THEREOF

(71) Applicant: Oclaro Japan, Inc., Kanagawa (JP)

(72) Inventor: Tadashi Okumura, Tokyo (JP)

(73) Assignee: OCLARO JAPAN, INC., Kanagawa (JP)

( * ) Notice: Subject to any disclaimer, the term of this patent is extended or adjusted under 35 U.S.C. 154(b) by 0 days.

(21) Appl. No.: 15/290,327

(22) Filed: Oct. 11, 2016

(65) Prior Publication Data

US 2017/0031114 A1     Feb. 2, 2017

Related U.S. Application Data

(63) Continuation of application No. 14/957,652, filed on Dec. 3, 2015.

(30) Foreign Application Priority Data

Dec. 11, 2014   (JP) .................................. 2014-251110

(51) Int. Cl.

| G02B 6/42 | (2006.01) |
|---|---|
| G02B 6/32 | (2006.01) |
| G02B 6/136 | (2006.01) |
| G02B 6/122 | (2006.01) |
| G02B 6/30 | (2006.01) |
| G02B 6/12 | (2006.01) |

(52) U.S. Cl.
CPC ......... *G02B 6/4226* (2013.01); *G02B 6/1228* (2013.01); *G02B 6/136* (2013.01); *G02B 6/305* (2013.01); *G02B 6/32* (2013.01); *G02B 6/4208* (2013.01); *G02B 6/4214* (2013.01); *G02B 6/4227* (2013.01); *G02B 2006/12061* (2013.01)

(58) Field of Classification Search
None
See application file for complete search history.

(56) References Cited

U.S. PATENT DOCUMENTS

| 5,872,880 A | 2/1999 | Maynard |
|---|---|---|
| 6,450,702 B1 | 9/2002 | Komoriya et al. |
| 7,009,747 B2 | 3/2006 | Hara et al. |
| 7,136,554 B1 | 11/2006 | Stevens |

(Continued)

FOREIGN PATENT DOCUMENTS

| JP | 59-111616 A * | 6/1984 |
|---|---|---|
| JP | 2012-517028 A | 7/2012 |

(Continued)

OTHER PUBLICATIONS

English translation of JP59-111616-A.*

*Primary Examiner* — Jerry Rahll
(74) *Attorney, Agent, or Firm* — Mattingly & Malur, PC

(57) ABSTRACT

An optical transmission module in which optical axis adjustment is possible in a wide range and with a high accuracy, and a method of manufacturing the optical transmission module are provided. An optical transmission module includes a light source that outputs light, a mirror that reflects the light output by the light source, a lever on which the mirror is arranged and that has a fulcrum, a lens that converges the light reflected by the mirror, and a waveguide that transfers the light converged by the lens, with a core having a section width smaller than a wavelength in vacuum of the light.

17 Claims, 12 Drawing Sheets

(56) References Cited

U.S. PATENT DOCUMENTS

2004/0114942 A1  6/2004  Yee et al.
2011/0013869 A1  1/2011  Pezeshki et al.
2013/0258505 A1  10/2013  Yasui et al.
2014/0233901 A1  8/2014  Hatori et al.

FOREIGN PATENT DOCUMENTS

JP  2013-231937 A  11/2013
JP  2014-157211 A  8/2014

* cited by examiner

OPTICAL TRANSMISSION MODULE AND MANUFACTURING METHOD THEREOF

CROSS-REFERENCE TO RELATED APPLICATION

The present application claims priority from Japanese application JP 2014-251110, filed on Dec. 11, 2014, the content of which is hereby incorporated by reference into this application.

BACKGROUND OF THE INVENTION

1. Field of the Invention

The present invention relates to an optical transmission module, and a method of manufacturing the optical transmission module.

2. Description of the Related Art

In order to improve the transmission speed and transmission capacity in optical communication, parallel transmission technology based on multi-channelization has been studied. In order to realize the multi-channelization, it is necessary to integrate a large number of elements. Integration of an electronic circuit and the optical circuit with silicon photonics technology for multi-channelization has therefore been studied.

A spot size converter including a second core and a third core extending in parallel with a first core and provided with a cladding layer interposed between the second core and the third core is described in JP 2014-157211 A.

Further, a method of manufacturing an optical device including a step of adjusting a position of an optical element by irradiating a first member and a second member with laser light to plastically deform the members is described in JP 2013-231937 A.

Further, an optical assembly including a movable lever that holds a lens that focuses light of a first waveguide on a second waveguide is described in JP 2012-517028 A.

Further, an optical coupler including a micro electro mechanical systems (MEMS) actuator that operates a mirror that causes an optical signal to be incident on an optical element is described in the specification of U.S. Pat. No. 7,136,554.

SUMMARY OF THE INVENTION

A sectional size of a core of a silicon waveguide formed using silicon photonics technology is smaller than a wavelength band (a 1.3 µm band to a 1.55 µm band which is a wavelength band in vacuum) used in optical communication, and it is necessary to couple light to the waveguide with an accuracy of 1 µm or less in order not to degrade the coupling efficiency of light incident on the waveguide. Here, an assembling tolerance of an optical system is usually several µm. When light is coupled to the waveguide, both of a coarse adjustment performed in an order of a few µm and fine adjustment performed in an order of 1 µm or less are required.

Therefore, an object of the present invention is to provide an optical transmission module in which optical axis adjustment is possible in a wide range and with a high accuracy, and a method of manufacturing the optical transmission module.

(1) According to an aspect of the present invention, there is provided an optical transmission module including: a light source that outputs light; a mirror that reflects the light output by the light source; a lever on which the mirror is arranged and that has a fulcrum; a lens that converges the light reflected by the mirror; and a waveguide that transfers the light converged by the lens, with a core having a waveguide width smaller than a wavelength in vacuum of the light.

(2) In the optical transmission module described in (1), the lever may be fixed by a fixing body.

(3) In the optical transmission module described in (1), when the lever is not fixed, the lever may be bent in a direction perpendicular to an extending direction by an external force.

(4) In the optical transmission module described in (1), when the lever is not fixed, the lever may expand and contract in an extending direction by an external force.

(5) In the optical transmission module described in (1), the lever may be a second-class lever including the fulcrum, and a handle portion that is a force point to which an external force is applied, and an action point at which the mirror is arranged, when the lever is not fixed.

(6) In the optical transmission module described in (1), the lever may be formed by etching an SOI layer.

(7) In the optical transmission module described in (6), the waveguide may be a silicon waveguide formed in the SOI layer.

(8) In the optical transmission module described in (6), the mirror may be formed with the lever by etching the SOI layer.

(9) In the optical transmission module described in (8), the mirror may be formed by performing anisotropic wet etching on the SOI layer.

(10) The optical transmission module described in (1) may further include a spot size converter between the lens and the waveguide.

(11) The optical transmission module described in (1) may further include an optical isolator between the lens and the mirror.

(12) In the optical transmission module described in (1), the light source may be a semiconductor laser.

(13) According to another aspect of the present invention, there is provided a method of manufacturing an optical transmission module including a light source that outputs light, a mirror that reflects the light output by the light source, a lever on which the mirror is arranged and that has a fulcrum, a lens that converges the light reflected by the mirror, and a waveguide that transfers the light converged by the lens, with a core having a section width smaller than a wavelength in vacuum of the light, the method including: an adjustment process of applying an external force to the lever and displacing the lever to adjust the light reflected by the mirror so that the light is coupled to the waveguide.

(14) The method of manufacturing an optical transmission module described in (13) may further include a fixing process of fixing the lever using a fixed body after the adjustment in the adjustment process.

(15) In the method of manufacturing an optical transmission module described in (13), in the adjustment process, an external force may be applied to the lever to expand and contract the lever in an extending direction.

(16) In the method of manufacturing an optical transmission module described in (13), in the adjustment process, an external force may be applied to the lever to bend the lever in a direction perpendicular to an extending direction.

(17) In the method of manufacturing an optical transmission module described in (13), in the adjustment process, a position of the lever to which the external force is applied may be opposite to the fulcrum based on a position at which the mirror is arranged.

(18) In the method of manufacturing an optical transmission module described in (13), the adjustment process may be a process of detecting a portion of the light transferred by the waveguide using an optical detector, applying an external force to the lever to displace the lever so that intensity of the light detected by the optical detector increases, and adjusting the light reflected by the mirror so that the light is coupled to the waveguide.

According to the present invention, an optical transmission module in which optical axis adjustment is possible in a wide range and with a high accuracy, and a method of manufacturing the optical transmission module are provided.

DETAILED DESCRIPTION OF THE INVENTION

Hereinafter, embodiments of the present invention will be described specifically and in detail based on the drawings. In all the drawings for describing the embodiments, members having the same function are denoted with the same reference signs and repeated description thereof will be omitted. The diagrams shown below only illustrate examples of the embodiments, and sizes of the diagrams and scales described in the embodiments do not necessarily match.

Figure 1:
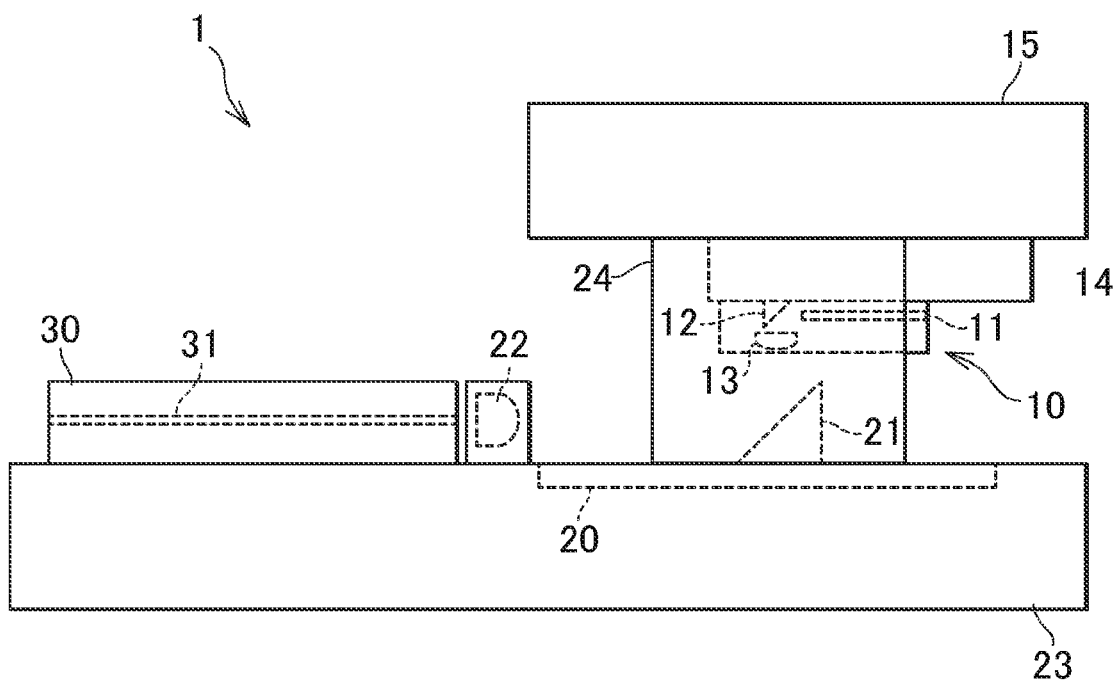
FIG. 1 is a side view of an optical communication device according to an embodiment of the present invention.
Figure 1:
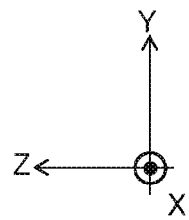

FIG. 1 is a side view of an optical communication device 1 (an optical transmission module) according to an embodiment of the present invention. FIG. 1 represents a Y-Z plane, and an X-axis is a forward axis passing through a paper surface. Here, the X-axis is an axis in a direction parallel to an SOI substrate 23 to be described below and perpendicular to an extending direction of a lever 20 to be described below, and constitutes a coordinate axis of the right-hand system in conjunction with a Y-axis and a Z-axis. The Y-axis is an axis perpendicular to the SOI substrate 23 to be described below, in which a stacking direction of the SOI substrate 23 is a positive direction. Further, the Z-axis is parallel to the extending direction of the lever 20 to be described below, in which a direction from a handle portion 20a of the lever 20 to a fulcrum is a positive direction. The optical communication device 1 according to this embodiment includes a semiconductor laser 10, the lever 20, a second mirror 21, a second lens 22, and a silicon waveguide 31. The semiconductor laser 10 is a light source that outputs light. The semiconductor laser 10 generates light, and includes an active layer 11 serving as a waveguide for the light, a first mirror 12 that reflects laser light output from an end surface of the active layer 11 downward (−Y-axis direction) in FIG. 1, and a first lens 13 that converts the light reflected by the first mirror 12 to parallel light. Here, the first mirror 12 has a right triangular shape, and has a reflective surface inclined by approximately 45°. Further, the first lens 13 may not necessarily convert the light reflected by the first mirror 12 to parallel light and may convert the reflected light to converge light or divergent light. In this embodiment, while the first mirror 12 and the first lens 13 are built into the semiconductor laser 10, both or one of the first mirror 12 and the first lens 13 may be formed separately from the semiconductor laser 10. Further, a surface emission laser rather than an end surface emission laser may be used as a light source. The semiconductor laser 10 included in the optical communication device 1 according to this embodiment is assumed to output laser light having a wavelength of approximately 1310 nm. However, the wavelength of the laser light may be in a 1.3 μm band or a 1.55 μm band that is typically used in optical communication.

The semiconductor laser 10 is mounted on a sub-mount 14, and the sub-mount 14 is fixed to a substrate 15. The semiconductor laser 10 is mounted on the SOI substrate 23 in which the optical circuit 30 or the like is arranged, between which a spacer 24 is interposed, in a state in which the semiconductor laser 10 is integral with the substrate 15.

The lever 20 has a fulcrum, and has a length of approximately 1 mm in the Z-axis direction. The lever 20 is formed by etching a silicon on insulator (SOI) layer. Generally, the SOI layer is the uppermost layer of the SOI substrate 23. The SOI substrate 23 is formed by laminating a Si substrate, a silicon oxide layer, and the SOI layer that is a single crystal silicon layer in order from a lower layer.

The second mirror 21 reflects the laser light output by the semiconductor laser 10, which is a light source, to the left (+Z-axis direction) in FIG. 1. In this embodiment, the second mirror 21 has an approximately right triangular shape when viewed from a side as illustrated in FIG. 1, and each of two sides between which an oblique side is interposed has a length of approximately 200 μm. In this embodiment, the second mirror 21 is formed by etching the SOI layer and is formed together with the lever 20. Any one of dry etching and wet etching may be used as the etching for forming the second mirror 21 and the lever 20, but a combination thereof may be used. The lever 20 and the second mirror 21 may be formed as a single body and may be incorporated into the optical communication device 1. By forming the lever 20 and the second mirror 21 integrally, position alignment at the time of assembly may be omitted, and a process of manufacturing the optical communication device 1 as a whole is simplified. In a reflective surface of the second mirror 21, it is preferable for a metal or the like to be deposited in order to improve the reflectance.

The second mirror 21 may be formed by anisotropic wet etching on the SOI layer. In the case of silicon, a crystal surface having a tilt angle of approximately 54° can be formed through wet etching using potassium hydroxide. This crystal surface can be the reflective surface of the second mirror 21. In this case, for example, if the reflective surface of the first mirror 12 is tilted approximately 18° toward an end surface of the active layer 11, light reflected by the second mirror 21 travels substantially parallel to the SOI substrate 23.

The second lens 22 converges the laser light reflected by the second mirror 21, and couples the laser light to the silicon waveguide 31 included in the optical circuit 30. In this embodiment, the second lens 22 is a plano-convex lens formed of silicon, and a radius of curvature of the lens is approximately 250 μm, and a focal length is approximately 100 μm. It is preferable for a surface of the second lens 22 to be coated with a low reflective film. The second lens 22 may be a lens formed of a material such as glass. Further, the number of lenses included in the optical communication device 1 may be other than two.

The silicon waveguide 31 transfers the light converged by the second lens 22, and is formed in the SOI layer of the SOI substrate 23. More specifically, the second lens 22 converges the laser light up to a spot size approximately corresponding to a wavelength (approximately 1.3 μm). Meanwhile, a section of a core of the silicon waveguide 31 has a rectangular shape of approximately 0.22 μm×0.5 μm, and has a single mode structure. A section width (waveguide width) of the core of the silicon waveguide 31 is approximately 0.5 μm at the maximum, and is smaller than the wavelength (approximately 1.3 μm) of the laser light output by the semiconductor laser 10. Therefore, when the laser light converged by the second lens 22 is directly coupled to the silicon waveguide 31, significant loss occurs. Therefore, in the optical communication device 1 according to this embodiment, the laser light converged by the second lens 22 is further converged using the spot size converter disclosed in JP 2014-157211 A or the like and coupled to the silicon waveguide 31. Arrangement of the spot size converter will be described in FIG. 3. Further, a distance between the second lens 22 and the spot size converter (a distance from a main point of the second lens 22 to an end surface on the second lens 22 side of the spot size converter) is assumed to be a focal length of the second lens 22. In this embodiment, since the focal length of the second lens 22 is approximately 100 μm, it is necessary to perform alignment so that the distance between the second lens 22 and the spot size converter is approximately 100 μm. In this specification, coupling light to the optical system refers to performing the alignment of the optical system so that the coupling efficiency (a log ratio of intensity of light before the light is incident on the optical system and intensity of light after the light is incident on the optical system) is within a predetermined range from a maximum value of the coupling efficiency. For example, the coupling efficiency may be within 5 dB from the maximum value, and preferably, within 1 dB.

Figure 2:
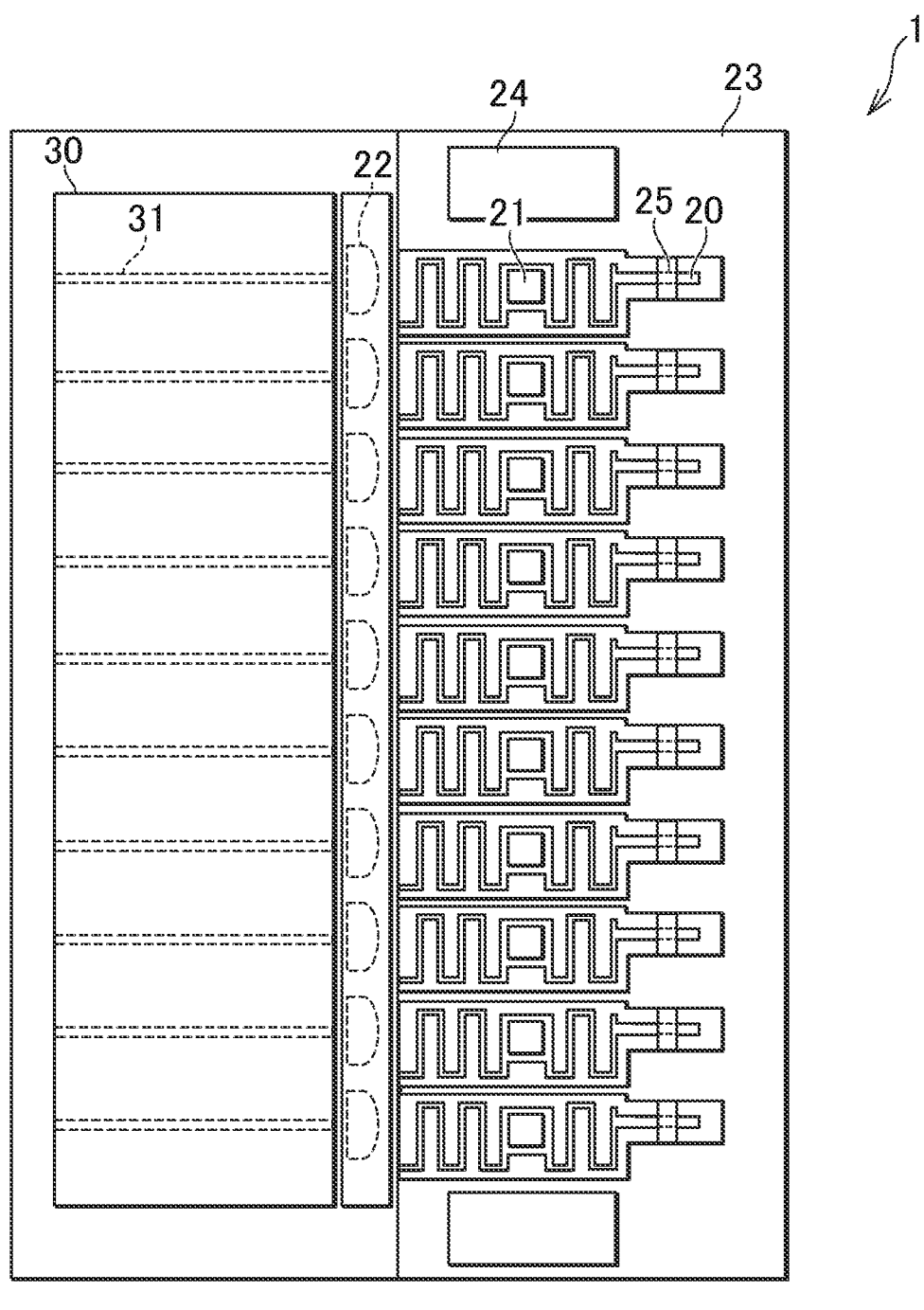
FIG. 2 is a plan view of the optical communication device according to the embodiment of the present invention.

FIG. 2 is a plan view of the optical communication device 1 according to an embodiment of the present invention. FIG. 2 represents an X-Z plane. In FIG. 2, the substrate 15, the sub-mount 14, and the semiconductor laser 10 are not illustrated so as to show the arrangement of the lever 20.

The lever 20 is formed inside a groove of the SOI substrate 23. The lever 20 has a cantilevered shape in which an end portion on the side (to the left in FIG. 2) in which the second lens 22 is arranged is a fulcrum. The lever 20 has a zigzag-shaped portion. An external force is applied to the handle portion 20a (a reference sign thereof is not illustrated in FIG. 2) that is an end portion opposite to the fulcrum. Accordingly, the zigzag-shaped portion can act as a spring and the handle portion can be displaced. The second mirror 21 is arranged on the lever 20. When the external force is applied to the handle portion of the lever 20, the second mirror 21 is displaced according to the displacement of the handle portion. However, in the optical communication device 1 as a finished product, the lever 20 is fixed by a solder 25 which is a fixing body. In the optical communication device 1 according to this embodiment, in an adjustment process before shipping, coupling between the light source and the silicon waveguide 31 is adjusted by applying the external force to the lever 20 to displace the second mirror 21. Then, in the fixing process, the lever 20 is fixed with the solder 25. The fixing body may be an ultraviolet curable resin or adhesive.

The optical communication device 1 according to this embodiment includes ten semiconductor lasers 10 as light sources. Light output from each of the semiconductor lasers 10 is reflected by the independently formed second mirror 21, is incident on the integrally formed lens 22, and is transferred by the silicon waveguide 31. In this embodiment, the ten semiconductor lasers 10 are arranged at 250 μm intervals in the X-axis direction. Here, positions of the ten second mirrors 21 can be independently adjusted by moving the independently formed lever 20. In the optical communication device 1 according to this embodiment, by independently moving the lever 20, the light output from the plurality of light sources can be coupled to the plurality of silicon waveguides 31. The number of light sources included in the optical communication device 1 may be ten or more or may be less than ten.

Figure 3:
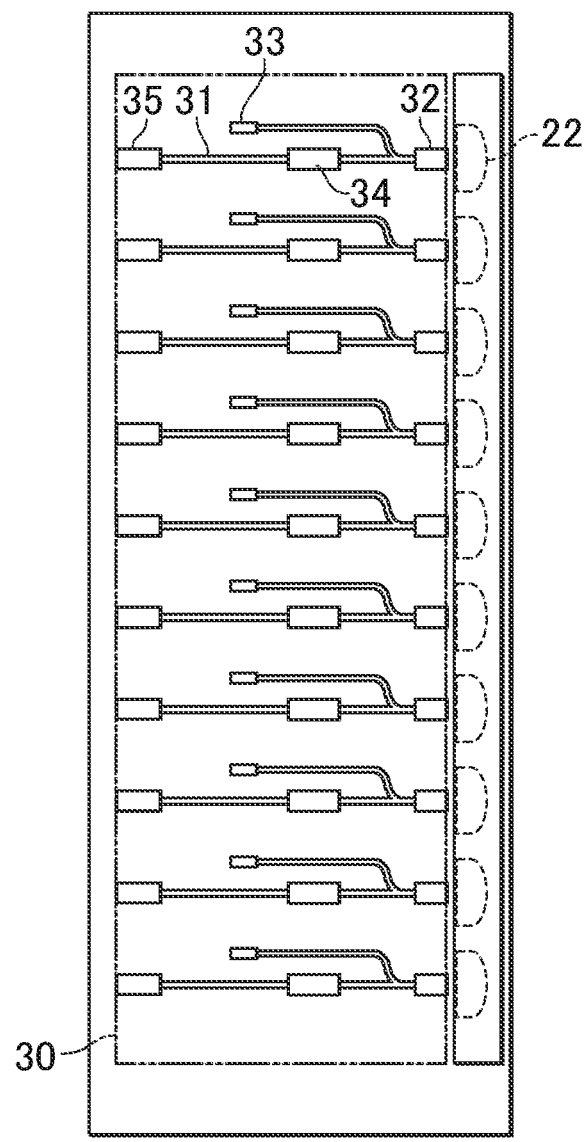
FIG. 3 is a plan view of an optical circuit according to an embodiment of the present invention.

FIG. 3 is a plan view of the optical circuit 30 according to an embodiment of the present invention. FIG. 3 represents an X-Z plane. FIG. 3 illustrates an internal structure of the optical circuit 30. The optical circuit 30 further includes a spot size converter 32, a photodiode 33, an optical modulator 34, and a fiber coupler 35, in addition to the silicon waveguide 31. In the optical communication device 1 according to this embodiment, the laser light converged by the second lens 22 is first incident on the spot size converter 32. The spot size converter 32 converges a spot size of the laser having a diameter of approximately 1.3 μm up to a spot size having a diameter of approximately 0.5 μm. Specifically, the spot size converter 32 is a silicon nitride waveguide of which an end surface on the second lens 22 side is 2 μm square. A sectional area of the silicon waveguide buried in the silicon nitride waveguide increases with progress to the silicon waveguide 31 so that the spot size converter 32 continuously connects to the silicon waveguide 31. A refractive index of the silicon nitride is approximately 2, and a refractive index of the silicon waveguide is approximately 3.5. Therefore, when the light travels from an end surface of the lens 22 to the silicon waveguide 31, the light transitions from a distribution defined by the silicon nitride waveguide to a distribution defined by the silicon waveguide, total reflection occurs at an interface between the silicon waveguide and the silicon nitride waveguide in a region in which the distribution of the light is defined by the silicon waveguide, and the light is converged on silicon waveguide.

A few % of the light to be transferred by the silicon waveguide 31 is branched, and an intensity of the light is detected by the photodiode 33 that is an optical detector. In the process of manufacturing the optical communication device 1 according to this embodiment, the lever 20 is moved and alignment of the second mirror 21 is performed so that the intensity of the detected light is maximized. Thus, by incorporating the photodiode 33 in the optical circuit 30, it is possible to perform coupling between the laser light and the silicon waveguide 31 even without connecting an optical fiber to the optical circuit 30. When the optical detector is arranged outside the optical circuit 30, an optical fiber is connected to the optical circuit 30, and the optical detector is connected to the optical fiber. Therefore, light detection is not performed if coupling between the optical circuit 30 and the optical fiber is not performed, in addition to the coupling between the light source and the silicon waveguide 31. Since the silicon waveguide 31 has a sectional area smaller than that of a conventional waveguide and it is relatively difficult for the silicon waveguide 31 to be coupled to the light source, it is more difficult to further perform coupling between the optical circuit 30 and the optical fiber. As in this embodiment, when the photodiode 33 that is an optical detector is built into the optical circuit 30, it is possible to perform the coupling between the light source and the silicon waveguide 31 even without coupling between the optical circuit 30 and the optical fiber.

In this embodiment, the optical modulator 34 is a Mach-Zehnder modulator. The optical modulator 34 is controlled by an external signal, modulates the laser light transferred by the silicon waveguide 31, and generates an optical signal. The optical signal generated by the optical modulator 34 is transferred to an optical fiber connected to the outside of the optical circuit 30 by the fiber coupler 35.

Figure 4:
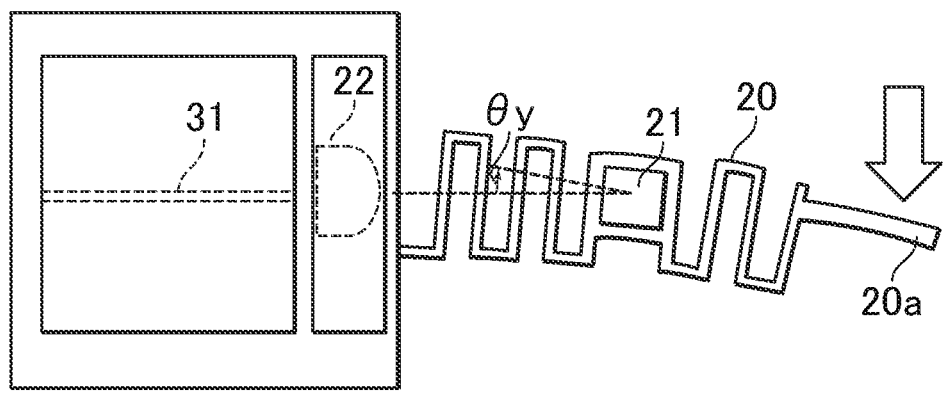
FIG. 4 is a plan view illustrating an adjustment process using a lever according to an embodiment of the present invention.
Figure 4:
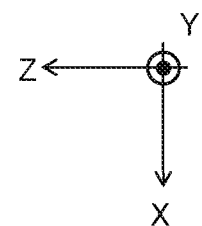

FIG. 4 is a plan view illustrating an adjustment process using the lever 20 according to this embodiment. FIG. 4 represents an X-Z plane. The lever 20 is bent in a direction perpendicular to the extending direction by an external force when a portion other than the fulcrum, such as the handle portion 20a, is not fixed. Here, the extending direction of the lever 20 is a Z-axis direction, and directions perpendicular to the extending direction are an X-axis direction and a Y-axis direction. The lever 20 is a second-class lever which includes a fulcrum located on the second lens 22 side, the handle portion 20a that is a force point to which the external force is applied, and an action point at which the second mirror 21 is arranged (a lever in which the action point is placed between the force point and the fulcrum) when the portion other than the fulcrum is not fixed. In the second-class lever, an amount of displacement of the force point is converted to an amount of displacement of the action point due to a magnification of less than 1 determined by a positional relationship between the force point and the action point.

Specifically, FIG. 4 illustrates a state in which an external force is applied to the handle portion 20a in the +X-axis direction and the lever 20 is bent in the +X-axis direction. Since the lever 20 is bent in the +X-axis direction, the reflective surface of the second mirror 21 arranged on the lever 20 is rotated clockwise by θy when the Y-axis is viewed from a positive direction to a negative direction, in which the Y-axis is a rotation axis. In this specification, a counterclockwise rotation angle is referred to as a positive rotation angle. Therefore, FIG. 4 illustrates a case in which the second mirror 21 is rotated by a negative angle.

When the second mirror 21 is rotated by θy about the Y-axis, the light output from the semiconductor laser 10 is shifted in the −X-axis direction and reflected, unlike before the rotation. In the adjustment process of the optical communication device 1 according to this embodiment, the external force is applied to the handle portion 20a of the lever 20 and the angle about the Y-axis of the second mirror 21 is adjusted so that the laser light output from the semiconductor laser 10 is coupled to the silicon waveguide 31.

Figure 5:
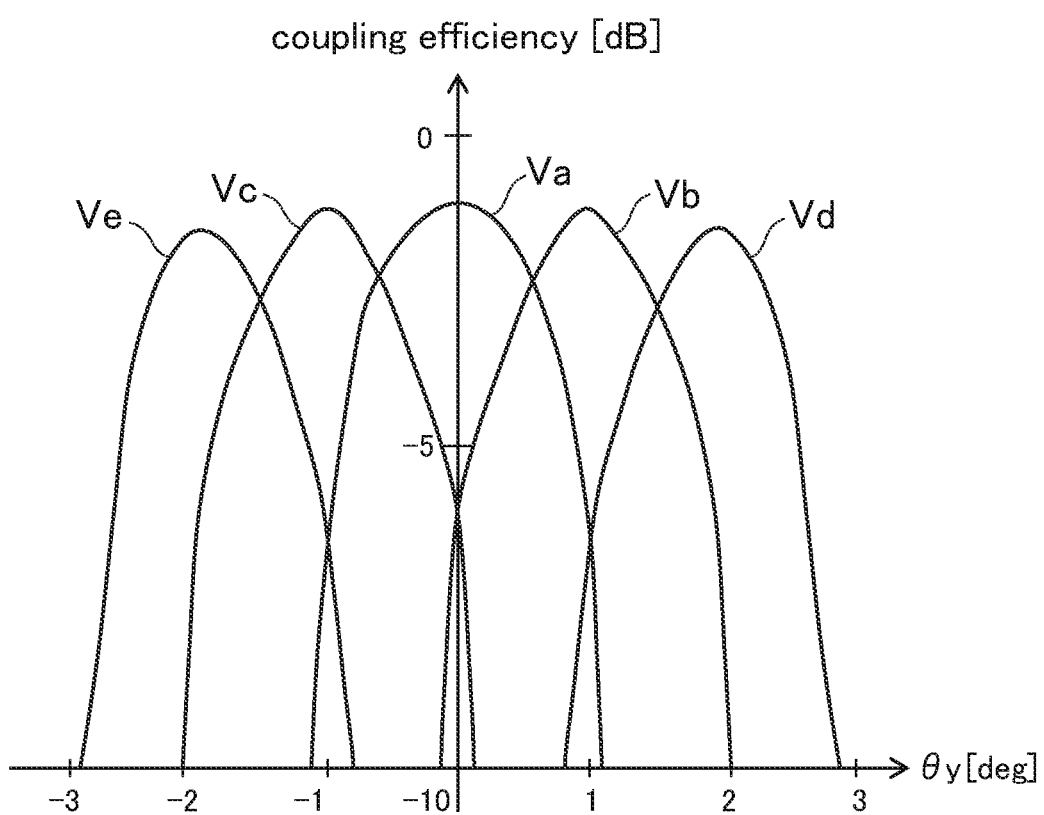
FIG. 5 is a graph illustrating a relationship between a rotation angle of a second mirror and the coupling efficiency according to an embodiment of the present invention.

FIG. 5 is a graph illustrating a relationship between the rotation angle θy of the second mirror 21 and the coupling efficiency according to an embodiment of the present invention. A horizontal axis indicates the rotation angle θy about the Y-axis of the second mirror 21 in units of degrees. A vertical axis indicates the coupling efficiency that is a log ratio $10 \times \log_{10}(I_{GUIDE}/I_{LASER})$ of intensity $I_{LASER}$ of laser light output from the semiconductor laser 10 and intensity $I_{GUIDE}$ of light transferred through the inside of the silicon waveguide 31. Here, the intensity $I_{GUIDE}$ of light transferred through the inside of the silicon waveguide 31 is calculated based on the intensity of light detected by the photodiode 33 built into the optical circuit 30, and a light branching ratio of the silicon waveguide 31 and a waveguide to which the photodiode 33 is connected.

A curve Va in FIG. 5 shows a relationship between the rotation angle θy of the second mirror 21 and the coupling efficiency when the second mirror 21 is not displaced and the laser light is coupled to the silicon waveguide 31. In the case of the curve Va, when the external force is not applied to the lever 20 and the second mirror 21 is not rotated (when θy=0), the coupling efficiency is maximized. In the case of the curve Va, the coupling efficiency decreases even when the lever 20 is displaced in any direction.

Further, a curve Vb in FIG. 5 shows a relationship between the rotation angle θy of the second mirror 21 and the coupling efficiency when the second mirror 21 is rotated in the positive direction and the laser light is coupled to the silicon waveguide 31. In the case of the curve Vb, when an external force in a −X-axis direction is applied to the lever 20 and the second mirror 21 is rotated in the positive direction (when θy>0), the coupling efficiency is maximized. Specifically, in the case of the curve Vb, the coupling efficiency is maximized when θy≅1°. In the case of the curve Vb, as the second mirror 21 is rotated in the positive direction, the coupling efficiency increases, reaches the maximum value, and then starts to decrease.

A curve Vc in FIG. 5 shows a relationship between the rotation angle θy of the second mirror 21 and the coupling efficiency when the second mirror 21 is rotated in the negative direction and the laser light is coupled to the silicon waveguide 31. In the case of the curve Vc, when the external force in the +X-axis direction is applied to the lever 20 and the second mirror 21 is rotated in the negative direction (when θy<0), the coupling efficiency is maximized. Specifically, in the case of the curve Vc, the coupling efficiency is maximized when θy≅−1°. In the case of the curve Vc, as the second mirror 21 is rotated in the negative direction, the coupling efficiency increases, reaches the maximum value, and then starts to decrease.

A curve Vd in FIG. 5 shows a relationship between the rotation angle θy of the second mirror 21 and the coupling efficiency when the second mirror 21 is greatly rotated in the positive direction as compared to the case of the curve Vb and the laser light is coupled to the silicon waveguide 31. In the case of the curve Vd, when an external force in a −X-axis direction is applied to the lever 20 and the second mirror 21 is rotated in the positive direction (when θy>0), the coupling efficiency is maximized. Specifically, in the case of the curve Vb, the coupling efficiency is maximized when $\theta y \cong 2°$. In the case of the curve Vd, when the second mirror 21 is not rotated, the coupling efficiency is −10 dB or less, but as the second mirror 21 is rotated in the positive direction, the coupling efficiency increases, reaches a maximum value, and then starts to decrease.

A curve Ve in FIG. 5 shows a relationship between the rotation angle $\theta y$ of the second mirror 21 and the coupling efficiency when the second mirror 21 is greatly rotated in a negative direction as compared to the case of the curve Vc and the laser light is coupled to the silicon waveguide 31. In the case of the curve Ve, when an external force is applied to the lever 20 in the +X-axis direction to rotate the second mirror 21 in the negative direction (when $\theta y \cong -0$), the coupling efficiency is maximized. Specifically, in the case of the curve Ve, the coupling efficiency is maximized when $\theta y \cong -2°$. In the case of the curve Ve, when the second mirror 21 is not rotated, the coupling efficiency is at −10 dB or less, but as the second mirror 21 is rotated in the negative direction, the coupling efficiency increases, reaches a maximum value, and then starts to decrease.

Figure 6:
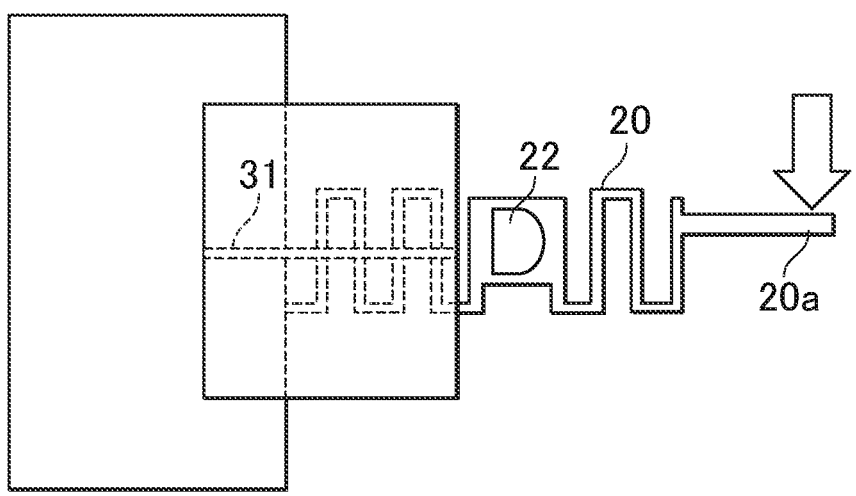
FIG. 6 is a plan view illustrating an adjustment process using a lever in a comparative example.
Figure 6:
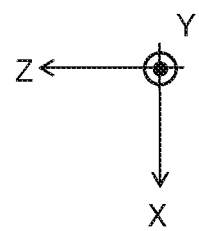

FIG. 6 is a plan view illustrating an adjustment process using a lever 20 in a comparative example. FIG. 6 represents an X-Z plane. In the comparative example, a second lens 22 is arranged on the lever 20. Here, since a focal length of the second lens 22 is shorter than a length in the Z-axis direction of the lever 20, an entrance of a silicon waveguide 31 should be close to the second lens 22 up to a position overlapping the lever 20. A lens having a long focal length may be considered to be used as the second lens 22. However, when the focal length becomes long by reducing a refractive index of the second lens 22, the second lens 22 cannot be formed together with lever 20 through etching of the SOI layer, and processes requiring a precise alignment increase. Further, when the focal length becomes long by increasing a radius of curvature without changing a diameter of the second lens 22, and an F value increases and sufficient brightness cannot be obtained. Therefore, when the focal length is increased by increasing the radius of curvature without changing a material of the second lens 22 (without changing the refractive index), there is a disadvantage that it is preferable to increase the diameter of the lens and the optical communication device becomes large. The second lens 22 may be arranged to be closer to the fulcrum of the lever 20. However, in this case, a magnification of leverage by the lever 20 is too small, and coarse adjustment for coupling the light to the waveguide becomes difficult.

In the comparative example, the laser light from the semiconductor laser 10 is incident on the second lens 22 from the right side in FIG. 6. In the adjustment process using the lever 20 in the comparative example, an external force in an X-axis direction is applied to the handle portion 20a of the lever 20, an arrangement angle of the second lens 22 is adjusted, and light is coupled to the silicon waveguide 31.

Figure 7:
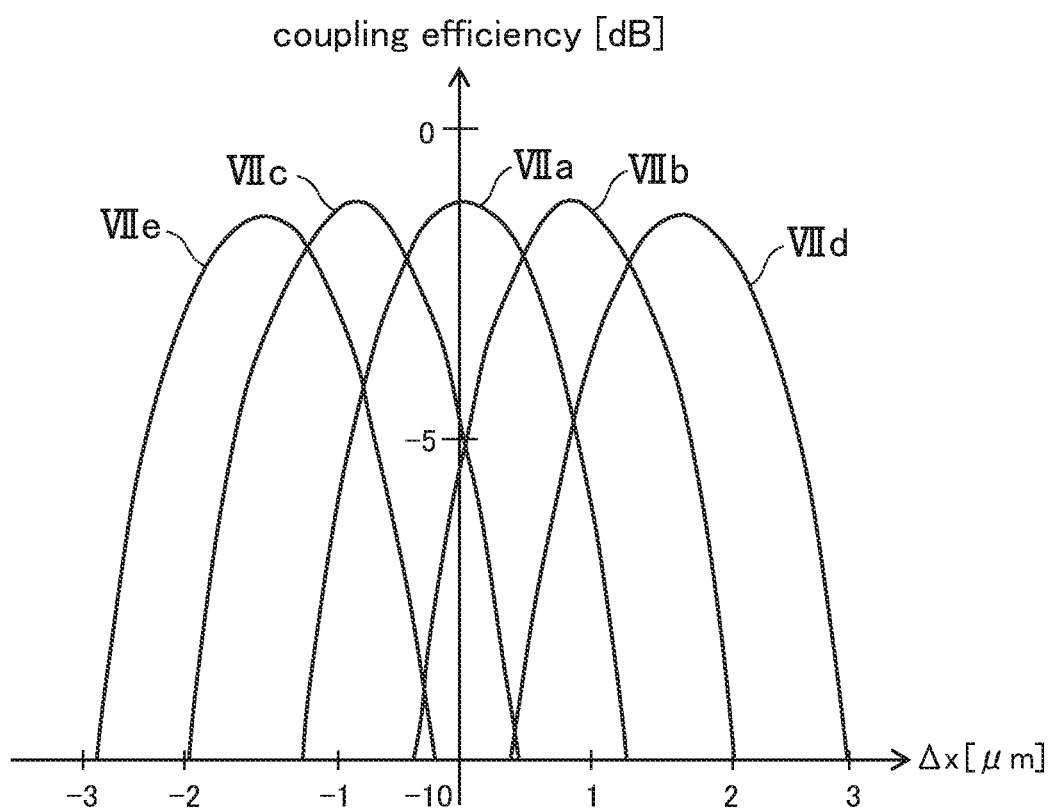
FIG. 7 is a graph illustrating a relationship between an amount of movement of a second lens and the coupling efficiency in the comparative example.

FIG. 7 is a graph illustrating a relationship between an amount of movement of the second lens 22 and coupling efficiency in the comparative example. A horizontal axis is an amount of displacement $\Delta x$ in the X-axis direction of the second lens 22 in μm. A vertical axis indicates a coupling efficiency that is a log ratio of intensity of light output from the semiconductor laser 10 and intensity of light transferred through the inside of the silicon waveguide 31.

A curve VIIa in FIG. 7 shows a relationship between the amount of displacement $\Delta x$ of the second lens 22 and the coupling efficiency when the second lens 22 is not displaced and the laser light is coupled to the silicon waveguide 31. In the case of the curve VIIa, when the external force is not applied to the lever 20 and the second lens 22 is not displaced (when $\Delta x$–0), the coupling efficiency is maximized. In the case of the curve VIIa, the coupling efficiency decreases even when the lever 20 is displaced in any direction.

Further, a curve VIIb in FIG. 7 shows a relationship between the amount of displacement $\Delta x$ of the second lens 22 and the coupling efficiency when the second lens 22 is rotated in the positive direction and the laser light is coupled to the silicon waveguide 31. In the case of the curve VIIb, when an external force in a +X-axis direction is applied to the lever 20 and the second lens 22 is displaced in the positive direction (when $\Delta x > 0$), the coupling efficiency is maximized. Specifically, in the case of the curve VIIb, the coupling efficiency is maximized when $\Delta x \cong 1$ μm. In the case of the curve VIIb, as the second lens 22 is displaced in the positive direction, the coupling efficiency increases, reaches the maximum value, and then starts to decrease.

A curve VIIc in FIG. 7 shows a relationship between the amount of displacement $\Delta x$ of the second lens 22 and the coupling efficiency when the second lens 22 is displaced in the negative direction and the laser light is coupled to the silicon waveguide 31. In the case of the curve VIIc, when the external force in the −X-axis direction is applied to the lever 20 and the second lens 22 is displaced in the negative direction (when $\Delta x < 0$), the coupling efficiency is maximized. Specifically, in the case of the curve VIIc, the coupling efficiency is maximized when $\Delta x \cong -1$ μm. In the case of the curve VIIc, as the second lens 22 is displaced in the negative direction, the coupling efficiency increases, reaches the maximum value, and then starts to decrease.

A curve VIId in FIG. 7 shows a relationship between the amount of displacement $\Delta x$ of the second lens 22 and the coupling efficiency when the second lens 22 is greatly displaced in the positive direction as compared to the case of the curve VIIb and the laser light is coupled to the silicon waveguide 31. In the case of the curve VIId, when an external force in a +X-axis direction is applied to the lever 20 and the second lens 22 is displaced in the positive direction (when $\Delta x > 0$), the coupling efficiency is maximized. Specifically, in the case of the curve VIIb, the coupling efficiency is maximized when $\Delta \cong 2$ μm. In the case of the curve VIId, when the second lens 22 is not displaced, the coupling efficiency is −10 dB or less, but as the second lens 22 is displaced in the positive direction, the coupling efficiency increases, reaches a maximum value, and then starts to decrease.

A curve VIIe in FIG. 7 shows a relationship between the amount of displacement $\Delta x$ of the second lens 22 and the coupling efficiency when the second lens 22 is greatly displaced in the negative direction as compared to the case of the curve VIIc and the laser light is coupled to the silicon waveguide 31. In the case of the curve VIIe, when an external force in the −X-axis direction is applied to the lever 20 and the second lens 22 is displaced in the negative direction (when $\Delta x < 0$), the coupling efficiency is maximized. Specifically, in the case of the curve VIIe, the coupling efficiency is maximized when $\Delta x \cong -2$ μm. In the case of the curve VIIe, when the second lens 22 is not rotated, the coupling efficiency is at −10 dB or less, but as the second lens 22 is displaced in the negative direction, the coupling efficiency increases, reaches a maximum value, and then starts to decrease.

Figure 8:
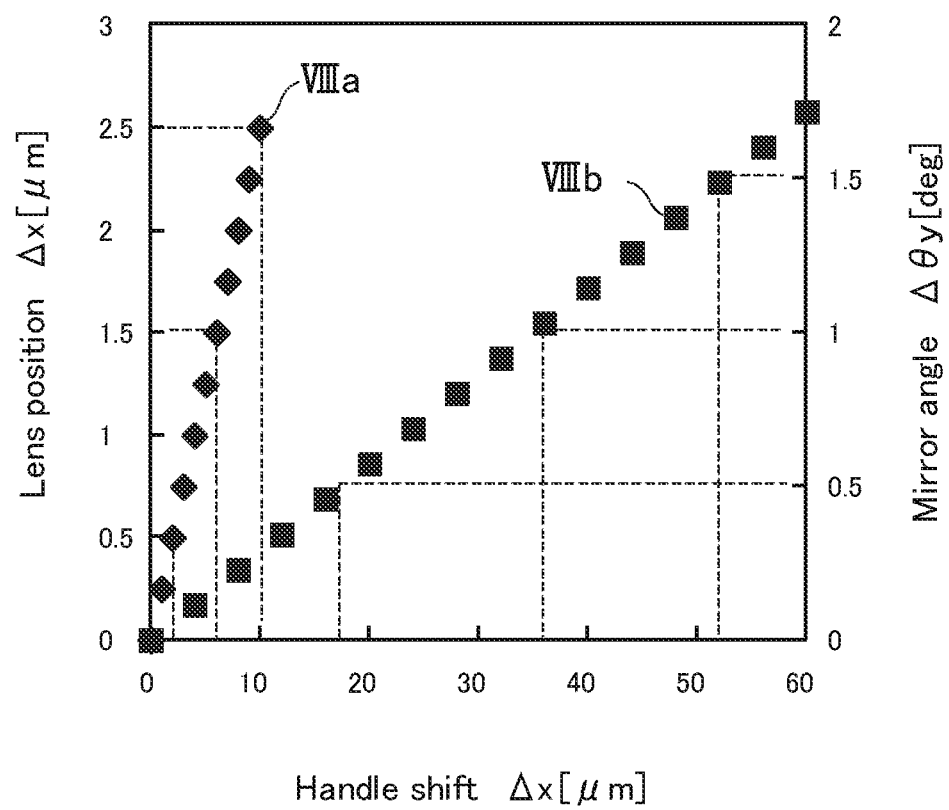
FIG. 8 is a graph showing both of a relationship between an amount of displacement of a handle portion and the rotation angle of the second mirror according to an embodiment of the present invention, and a relationship between an amount of displacement of a handle portion and an amount of displacement of the second lens according to the comparative example.

FIG. 8 is a graph showing both of a relationship between the amount of displacement of the handle portion 20a and the rotation angle $\theta y$ of the second mirror 21 according to an embodiment of the present invention, and a relationship between an amount of displacement of the handle portion 20a and the amount of displacement Δx of the second lens 22 according to the comparative example. A horizontal axis indicates the amount of displacement Δx of the handle portion 20a of the lever 20 in μm. A first vertical axis (a vertical axis shown to the left of FIG. 8) indicates the amount of displacement Δx of the second lens 22 in μm in the comparative example. Further, a second vertical axis (vertical axis shown to the right of FIG. 8) indicates the rotation angle θy of the second mirror 21 in units of degrees in this embodiment. In the case of comparative example, when the amount of displacement Δx of the handle portion 20a changes in a range of 2 μm to 10 μm, the amount of displacement Δx of the second lens 22 changes in a range of 0.5 μm to 2.5 μm. In the case of this embodiment, when the amount of displacement Δx of the handle portion 20a changes in the range of 18 μm to 52 μm, the rotation angle θy of the second mirror 21 changes in a range of 0.5° to 1.5°.

In the case of the comparative example (in the case of plot points indicated by VIIIa in FIG. 8), when the handle portion 20a is displaced by 1 μm, the second lens 22 are displaced by approximately 0.25 μm. That is, a magnification of leverage by the lever 20 is approximately 0.25. In the case of the comparative example, when the second lens 22 is shifted by approximately ±0.4 μm from a position at which coupling efficiency is maximized, the coupling efficiency is reduced by approximately 1 dB. Therefore, when a loss of 1 dB is allowed for the coupling efficiency, the handle portion 20a should be aligned with an accuracy of approximately ±1.6 μm.

On the other hand, in the case of this embodiment (in the case of plot points indicated by VIIIb in FIG. 8), when the handle portion is displaced by 1 μm, the second mirror 21 is rotated by approximately 0.03°. In the case of this embodiment, when the second lens 22 is shifted by approximately ±0.4° from an angle at which the coupling efficiency is maximized, the coupling efficiency is reduced by approximately 1 dB. Therefore, when a loss of 1 dB is allowed for the coupling efficiency, the handle portion 20a may be aligned with an accuracy of approximately ±13 μm. A required accuracy is approximately ⅛ of than that in the comparative example. In the comparative example and this embodiment, the magnification does not change. However, when a distance from the second mirror 21 to the spot size converter 32 is L1 and the amount of displacement in the X-axis direction of the second mirror 21 is represented by Δx, the rotation angle θy of the second mirror 21 in this embodiment has a relationship of θy≅−Δx/L1, and accordingly, the displacement of the second mirror 21 is reduced by a distance L1 from the second mirror 21 to the silicon waveguide 31 and fine adjustment of the second mirror 21 is facilitated, unlike the comparative example.

As illustrated in FIG. 7, in the case of the comparative example, it is necessary to couple the laser light to the silicon waveguide 31 by displacing the second lens 22 by approximately ±2 μm in the X-axis direction. Here, the lever 20 is displaced by approximately ±5 μm when the lever 20 is fixed by a fixing body such as the solder 25. Therefore, alignment of the lever 20 is performed only with an accuracy of approximately ±5 μm. When the lever 20 is displaced by approximately 5 μm, the second lens 22 is displaced by approximately 1 μm. Therefore, in the case of the comparative example, even when the coupling efficiency is adjusted to be maximized in the adjustment process, a loss of approximately −5 dB may occur after the fixing process. Thus, in the case of the comparative example, the alignment of the second lens 22 can be coarsely adjusted, but there is a disadvantage that fine adjustment is difficult.

On the other hand, in the case of this embodiment, the second mirror 21 is rotated by approximately ±2° to couple the laser light to the silicon waveguide 31. In the case of this embodiment, even when the lever 20 is displaced by approximately ±5 μm when the lever 20 is fixed, the second mirror 21 is only rotated by approximately ±0.15°. Therefore, in the case of this embodiment, even when the position of the lever 20 is displaced by approximately ±5 μm in the fixing process, the coupling efficiency hardly changes from a value set in the adjustment process (see FIG. 5). Therefore, according to the optical communication device 1 of this embodiment, optical axis adjustment of the laser light can be performed in a wide range and with a high accuracy, and both of coarse adjustment and fine adjustment for coupling the laser light to the silicon waveguide 31 are simply performed. When substantially the same accuracy as that in this embodiment is obtained in the comparative example, it is necessary for a length of the lever 20 to be several cm, and adverse effects such as a large size of the device or a decrease in strength of the lever 20 are caused.

Further, when the lever is continuously operated so as to maintain an optimum optical coupling state, for example, using a micro electro mechanical systems (MEMS) mechanism as disclosed in U.S. Pat. No. 7,136,554, a high voltage power source for operating the MEMS or a feedback mechanism for controlling the MEMS (a monitor such as a photodiode that monitors a state, a control circuit, or the like) is required, and adverse effect of a large size of the device or an increase in power consumption are caused. Therefore, as shown in this embodiment, adopting a structure in which the lever is fixed after the optical axis adjustment and a shift at the time of fixing is absorbed is very effective. While a term MEMS or actuator is used in micro-mechanical structures, the term is assumed to refer to a piezoelectric element or a structure that is voluntarily operable through an electromagnetic force or the like in this specification. While the lever may also be referred to as actuator, the lever 20 has a structure that does not operate autonomously and is deformed by an external mechanical force and, accordingly, is different from the MEMS device described in U.S. Pat. No. 7,136,554.

Figure 9:
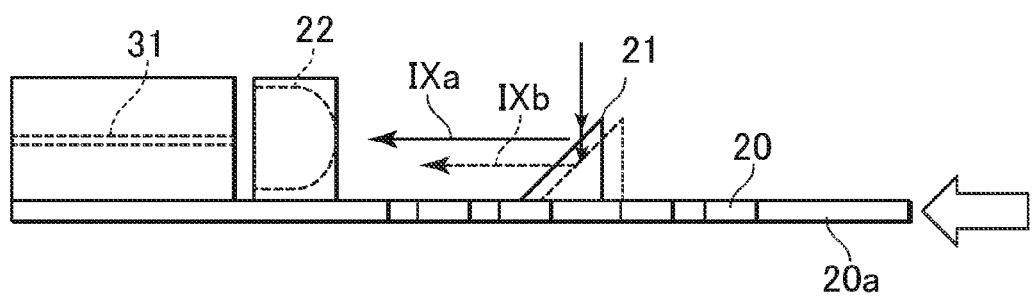
FIG. 9 is a side view illustrating an adjustment process using the lever according to an embodiment of the present invention.
Figure 9:
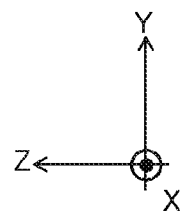

FIG. 9 is a side view illustrating an adjustment process using the lever 20 according to an embodiment of the present invention. FIG. 9 represents a Y-Z plane. When a portion other than the fulcrum of the lever 20 is not fixed, the lever 20 expands and contracts in an extending direction due to an external force. Here, the extending direction of the lever 20 is a Z-axis direction (+Z-axis direction and −Z-axis direction). A zigzag-shaped portion of the lever 20 is deformed due to an external force applied in the Z-axis direction, and the lever 20 expands and contracts in the Z-axis direction. When the lever 20 expands and contracts in the Z-axis direction, a second mirror 21 arranged on the lever 20 is displaced in the Z-axis direction. When the second mirror 21 is displaced in the Z-axis direction, a position in the Y-axis direction at which the laser light is reflected by the reflective surface of the second mirror 21 is changed. Therefore, by applying the external force to the handle portion 20a in the Z-axis direction, it is possible to adjust the position in the Y-axis direction of the light incident on the second lens 22 and perform adjustment so that the light can be coupled to the silicon waveguide 31.

An arrow IXa indicates an optical path of the laser light when an external force in the +Z-axis direction is applied to the handle portion 20a and the second mirror 21 is displaced in the +Z-axis direction. Meanwhile, an arrow IXb indicated by a dotted line indicates the optical path of the laser light when the external force is not applied to the handle portion 20a and the second mirror 21 is not displaced. When the external force in the +Z-axis direction is applied to the handle portion 20a and the second mirror 21 is displaced in the +Z-axis direction, the optical path is displaced in the +Y-axis direction as compared to the case in which the external force is not applied to the handle portion 20a.

Figure 10:
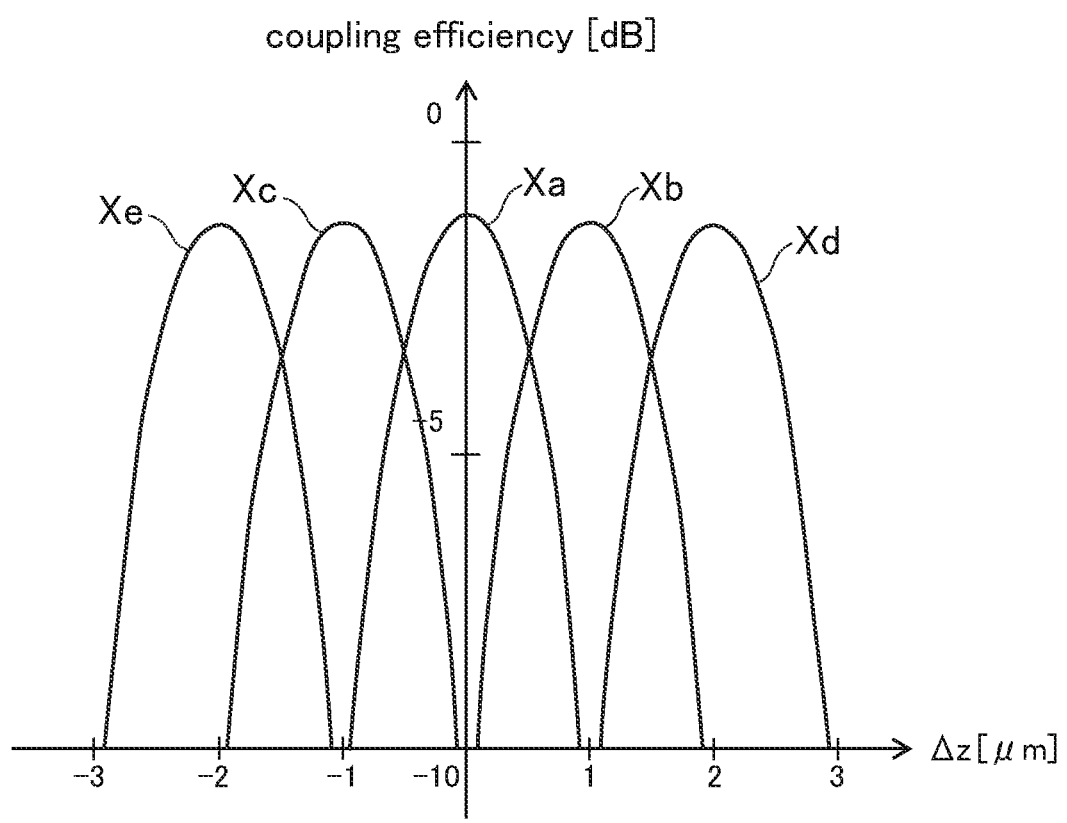
FIG. 10 is a graph illustrating a relationship between an amount of displacement of the second mirror and the coupling efficiency according to an embodiment of the present invention.

FIG. 10 is a graph illustrating a relationship between the amount of displacement of the second mirror 21 and the coupling efficiency according to an embodiment of the present invention. A horizontal axis indicates an amount of displacement $\Delta z$ in the Z-axis direction of the second mirror 21 in μm. A vertical axis indicates coupling efficiency that is a log ratio $10 \times \log_{10} (I_{GUIDE}/I_{LASER})$ of an intensity $I_{LASER}$ of the laser light output from the semiconductor laser 10 and an intensity $I_{GUIDE}$ of the light transferred through the inside of the silicon waveguide 31.

A curve Xa in FIG. 10 shows a relationship between the amount $\Delta z$ of displacement of the second mirror 21 and the coupling efficiency when the laser light is coupled to the silicon waveguide 31 even without displacement of the second mirror 21. In the case of the curve Xa, when the external force is not applied to the lever 20 and the second mirror 21 is not displaced (when $\Delta z=0$), the coupling efficiency is maximized. In the case of the curve Xa, the coupling efficiency decreases even when the lever 20 is displaced in any direction with respect to the Z-axis.

Further, a curve Xb in FIG. 10 shows a relationship between the amount of displacement $\Delta z$ of the second mirror 21 and the coupling efficiency when the second mirror 21 is rotated in a +Z-axis direction and the laser light is coupled to the silicon waveguide 31. In the case of the curve Xb, when an external force in a +Z-axis direction is applied to the lever 20 and the second mirror 21 is displaced in the positive direction (when $\Delta z>0$), the coupling efficiency is maximized. Specifically, in the case of the curve Xb, the coupling efficiency is maximized when $\Delta z \cong 1$ μm. In the case of the curve Xb, as the second mirror 21 is displaced in the positive direction, the coupling efficiency increases, reaches the maximum value, and then starts to decrease.

A curve Xc in FIG. 10 shows a relationship between the amount of displacement $\Delta z$ of the second mirror 21 and the coupling efficiency when the second mirror 21 is displaced in a −Z-axis direction and the laser light is coupled to the silicon waveguide 31. In the case of the curve Xc, when the external force in the −Z-axis direction is applied to the lever 20 and the second mirror 21 is displaced in the negative direction (when $\Delta z<0$), the coupling efficiency is maximized. Specifically, in the case of the curve Xc, the coupling efficiency is maximized when $\Delta z \cong -1$ μm. In the case of the curve Xc, as the second mirror 21 is displaced in the negative direction, the coupling efficiency increases, reaches the maximum value, and then starts to decrease.

A curve Xd in FIG. 10 shows a relationship between the amount of displacement $\Delta z$ of the second mirror 21 and the coupling efficiency when the second mirror 21 is greatly displaced in the +Z-axis direction as compared to the case of the curve Xb and the laser light is coupled to the silicon waveguide 31. In the case of the curve Xd, when an external force in a +X-axis direction is applied to the lever 20 and the second mirror 21 is displaced in the positive direction (when $\Delta z>0$), the coupling efficiency is maximized. Specifically, in the case of the curve Xb, the coupling efficiency is maximized when $\Delta z \cong 2$ μm. In the case of the curve Xd, when the second mirror 21 is not displaced, the coupling efficiency is −10 dB or less, but as the second mirror 21 is displaced in the positive direction, the coupling efficiency increases, reaches a maximum value, and then starts to decrease.

A curve Xe in FIG. 10 shows a relationship between the amount of displacement $\Delta z$ of the second mirror 21 and the coupling efficiency when the second mirror 21 is greatly displaced in the −Z-axis direction as compared to the case of the curve Xc and the laser light is coupled to the silicon waveguide 31. In the case of the curve Xe, when an external force in the −Z-axis direction is applied to the lever 20 and the second mirror 21 is displaced in the negative direction (when $\Delta z<0$), the coupling efficiency is maximized. Specifically, in the case of the curve Xe, the coupling efficiency is maximized when $\Delta z \cong -2$ μm. In the case of the curve Xe, when the second mirror 21 is not displaced, the coupling efficiency is at −10 dB or less, but as the second mirror 21 is displaced in the negative direction, the coupling efficiency increases, reaches a maximum value, and then starts to decrease.

Thus, according to the optical communication device 1 in this embodiment, a position of the light incident on the silicon waveguide 31 can be adjusted in the Y-axis direction. Therefore, in conjunction with the adjustment illustrated in FIG. 4 to rotate the second mirror 21 about the Y-axis and change the position of the light incident on the silicon waveguide 31 in the X-axis direction, the position of the light incident on the silicon waveguide 31 can be adjusted two-dimensionally so that the light is coupled to the silicon waveguide 31. On the other hand, in the case of the comparative example, it is necessary for adjustment of the position of the light in the Y-axis direction to be performed by moving the semiconductor laser 10 itself in the Y-axis direction. When a structure that moves the semiconductor laser 10 is added, there is a disadvantage that the device becomes large and cost increases. Further, while the adjustment can be performed by raising and lowering the lever 20 in the Y-axis direction without moving the semiconductor laser 10, fine adjustment is difficult due to a problem such as position deviation that may occur when the lever 20 is fixed by soldering as described above.

Figure 11:
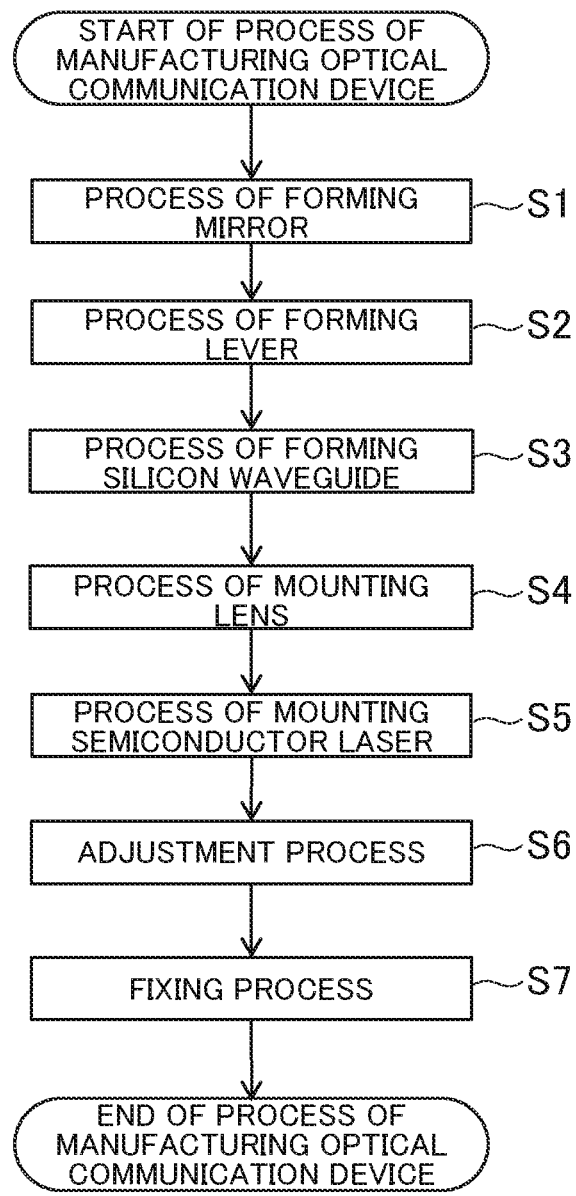
FIG. 11 is a flowchart illustrating a process of manufacturing the optical communication device according to an embodiment of the present invention.

FIG. 11 is a flowchart illustrating a process of manufacturing the optical communication device 1 according to an embodiment of the present invention. First, a process of forming the second mirror 21 by etching the SOI layer which is an uppermost layer of the SOI substrate 23 is performed (S1). Here, the second mirror 21 may be formed as a single body.

Then, a process of forming the lever 20 by etching the SOI layer is performed (S2). The lever 20 and the second mirror 21 may be both formed by etching the SOI layer. Dry etching, wet etching, or a combination thereof may be used as etching for forming the second mirror 21 and the lever 20. When the second mirror is formed as a single body, it is necessary to perform a process of forming the lever 20 and then fixing the second mirror 21 to the lever 20 using soldering or the like.

Then, a process of forming the silicon waveguide 31 in the SOT layer is performed (S3). Here, the optical circuit 30 including the spot size converter 32, the photodiode 33, and the optical modulator 34 may be formed. The silicon waveguide 31 (which may include the optical circuit 30) may be formed as a separate body or may be arranged on the SOI layer.

Further, a process of mounting the second lens 22 which converges the light toward the optical circuit 30 on the SOI substrate 23 is performed (S4). The second lens 22 may be a lens in which the same number of lenses as the number of light sources may be integrally molded. When the integrally molded lens is mounted on the SOI substrate 23, alignment is performed so that a focal length is fit to the spot size converter 32. The same number of lenses as the number of light sources may be independently formed and mounted on the SOI substrate 23.

Then, a process of mounting the semiconductor laser 10 on the SOI substrate 23 is performed (S5). The semiconductor laser 10 is fixed to the SOI substrate 23 between which the spacer 24 is interposed. The semiconductor laser 10 is aligned so that laser light emitted from the semiconductor laser 10 is incident on the second mirror 21. Here, the alignment of the semiconductor laser 10 need not be performed so that the laser light is coupled to the silicon waveguide 31.

Then, an adjustment process of performing adjustment to apply an external force to the lever 20 to displace the lever 20 so that the laser light reflected by the second mirror 21 is coupled to the silicon waveguide 31 is performed (S6). In the adjustment process, a process of adjusting an angle θy about the Y-axis of the second mirror 21 and the amount of displacement Δz in the Z-axis direction so that the laser light is coupled to the silicon waveguide 31 is performed. Here, the angle θy about the Y-axis of the second mirror 21 is adjusted by applying the external force to the lever 20 so that the lever 20 is bent in a direction (X-axis direction in FIG. 4) perpendicular to the extending direction. Further, the amount of displacement Δz in the Z-axis direction is adjusted by applying an external force to the lever 20 to expand and contract the lever 20 in the extending direction (Z-axis direction in FIG. 9). A position of the lever 20 at which the external force is applied is the handle portion 20a of the lever 20. The handle portion 20a is on the side opposite to the fulcrum of the lever 20 based on the position at which the second mirror 21 is arranged.

In the adjustment process, a portion of the laser light transferred by the silicon waveguide 31 is detected by the photodiode 33 that is an optical detector, an external force is applied to the lever 20 to displace the lever 20 so that the intensity of light detected by the photodiode 33 increases, and the laser light reflected by the second mirror 21 is adjusted to be coupled to the silicon waveguide 31. Accordingly, the laser light reflected by the second mirror 21 is adjusted to be coupled to the silicon waveguide 31 without coupling the optical fiber to the optical circuit 30.

After the adjustment in the adjustment process is performed, a fixing process of fixing the lever 20 using the fixing body is performed (S7). In the fixing process, the lever 20 is fixed by the fixing body such as a solder. Here, fixing of the lever 20 is performed by fixing at least a portion other than the fulcrum. For example, the handle portion 20a may be fixed.

Thus, the process of manufacturing the optical communication device 1 according to this embodiment ends. According to the process of manufacturing the optical communication device 1 according to this embodiment, it is possible to adjust the optical axis of the laser light in a wide range and with a high accuracy by adjusting the position of the second mirror 21 arranged on the lever 20 in the adjustment process, and it is possible to easily couple the laser light to the silicon waveguide 31.

Figure 12:
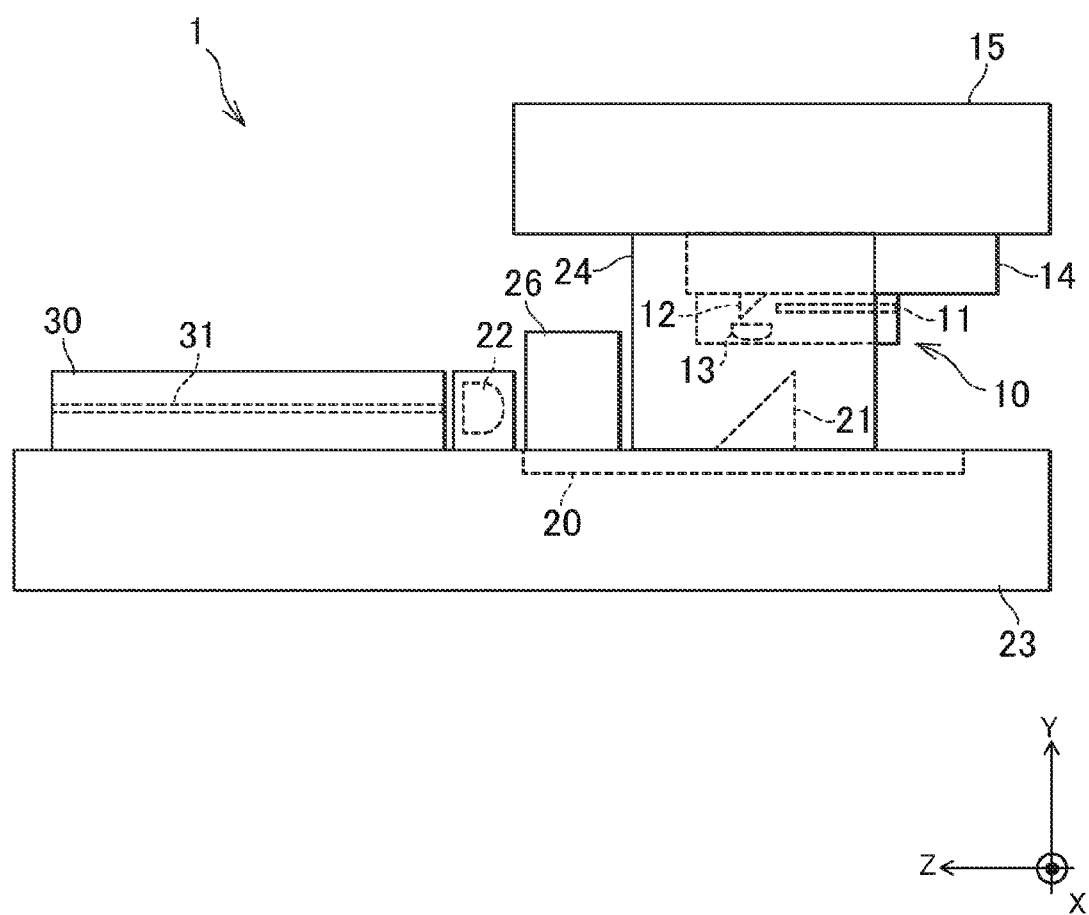
FIG. 12 is a side view of an optical communication device according to a modification example of an embodiment of the present invention.

FIG. 12 is a side view of an optical communication device 1 according to a modification example of an embodiment of the present invention. FIG. 12 represents a Y-Z plane. A difference between the optical communication device 1 according to the modification example and the optical communication device 1 according to the normal embodiment is that an optical isolator 26 is included between a second lens 22 and a second mirror 21. The optical isolator 26 is an optical element that uses a birefringence of the light and a Faraday effect for linear polarization. The optical isolator 26 passes light incident in a forward direction, but does not pass light incident in a backward direction. In the case of the modification example, the optical isolator 26 passes light traveling in the +Z-axis direction, and does not pass light traveling in the −Z-axis direction.

In the optical communication device 1 according to the modification example, the optical isolator 26 prevents light reflected by the second lens 22 or the silicon waveguide 31 from returning to the semiconductor laser 10. Therefore, stable laser oscillation of the semiconductor laser 10 is maintained.

While there have been described what are at present considered to be certain embodiments of the invention, it will be understood that various modifications may be made thereto, and it is intended that the appended claims cover all such modifications as fall within the true spirit and scope of the invention.

What is claimed is:

1. An optical transmission module, comprising:
   a light source that outputs light;
   a mirror that reflects the light output by the light source; and
   a lever on which the mirror is arranged and that has a fulcrum,
   wherein when the lever is not fixed, the lever is bent in a direction perpendicular to an extending direction due to an external force.

2. The optical transmission module according to claim 1, further comprising:
   a lens that converges the light reflected by the mirror.

3. The optical transmission module according to claim 2, further comprising:
   a waveguide that transfers the light converged by the lens.

4. The optical transmission module according to claim 3, further comprising:
   a spot size converter between the lens and the waveguide.

5. The optical transmission module according to claim 2, further comprising:
   an optical isolator between the lens and the mirror.

6. The optical transmission module according to claim 1, wherein the light source is a semiconductor laser.

7. An optical transmission module, comprising:
   a light source that outputs light;
   a mirror that reflects the light output by the light source; and
   a lever on which the mirror is arranged and that has a fulcrum,
   wherein the lever is a second-class lever including the fulcrum, a handle portion that is a force point to which an external force is applied, and an action point at which the mirror is arranged, when the lever is not fixed.

8. An optical transmission module, comprising:
   a light source that outputs light:
   a mirror that reflects the light output by the light source; and
   a lever on which the mirror is arranged and that has a fulcrum,
   wherein the lever is formed by etching an SOI layer.

9. The optical transmission module according to claim 8, wherein the waveguide is a silicon waveguide formed in the SOI layer.

10. The optical transmission module according to claim 8, wherein the mirror is formed with the lever by etching the SOI layer.

11. The optical transmission module according to claim 10, wherein the mirror is formed by anisotropic wet etching on the SOI layer.

12. An optical transmission module, comprising:
a light source that outputs light:
a mirror that reflects the light output by the light source; and
a lever on which the mirror is arranged and that has a fulcrum,
wherein when the lever is not fixed, the lever expands and contracts in an extending direction due to an external force.

13. A method of manufacturing an optical transmission module including a light source that outputs light, a mirror that reflects the light output by the light source, a lever on which the mirror is arranged and that has a fulcrum, a lens that converges the light reflected by the mirror, and a waveguide that transfers the light converged by the lens, the method comprising:
an adjustment process of applying an external force to the lever and displacing the lever to adjust the light reflected by the mirror so that the light is coupled to the waveguide,
wherein in the adjustment process, an external force is applied to the lever to bend the lever in a direction perpendicular to an extending direction.

14. A method of manufacturing an optical transmission module including a light source that outputs light, a mirror that reflects the light output by the light source, a lever on which the mirror is arranged and that has a fulcrum, a lens that converges the light reflected by the mirror, and a waveguide that transfers the light converged by the lens, the method comprising:
an adjustment process of applying an external force to the lever and displacing the lever to adjust the light reflected by the mirror so that the light is coupled to the waveguide,
wherein in the adjustment process, a position of the lever to which the external force is applied is opposite to the fulcrum based on a position at which the mirror is arranged.

15. A method of manufacturing an optical transmission module including a light source that outputs light, a mirror that reflects the light output by the light source, a lever on which the mirror is arranged and that has a fulcrum, a lens that converges the light reflected by the mirror, and a waveguide that transfers the light converged by the lens, the method comprising:
an adjustment process of applying an external force to the lever and displacing the lever to adjust the light reflected by the mirror so that the light is coupled to the waveguide,
wherein in the adjustment process, an external force is applied to the lever to expand and contract the lever in an extending direction.

16. The method of manufacturing an optical transmission module according to claim 15, further comprising:
a fixing process of fixing the lever using a fixed body after the adjustment in the adjustment process.

17. The method of manufacturing an optical transmission module according to claim 15, wherein the adjustment process is a process of detecting a portion of the light transferred by the waveguide using an optical detector, applying an external force to the lever to displace the lever so that intensity of the light detected by the optical detector increases, and adjusting the light reflected by the mirror so that the light is coupled to the waveguide.

\* \* \* \* \*